United States Patent [19]

Goodson et al.

[11] Patent Number: 4,607,159

[45] Date of Patent: Aug. 19, 1986

[54] OPTICAL JOYSTICK CONTROLLER WITH INTERSECTING SPRING MEANS

[75] Inventors: Larry E. Goodson, Blaine; Charles E. Dellinger, Knoxville, both of Tenn.

[73] Assignee: North American Philips Consumer Electronics Corp., New York, N.Y.

[21] Appl. No.: 566,098

[22] Filed: Dec. 27, 1983

[51] Int. Cl.⁴ .............................................. G01V 9/04

[52] U.S. Cl. .................................... 250/221; 250/229; 74/471 XY

[58] Field of Search ............ 250/229, 221; 74/471 R, 74/471 XY; 340/709

[56] References Cited

U.S. PATENT DOCUMENTS

| | | | |
|---|---|---|---|
| 3,521,072 | 7/1970 | Wipson et al. | 250/221 |
| 3,811,047 | 5/1974 | Shragal | 250/221 |
| 3,814,199 | 6/1974 | Jones | 250/229 |
| 4,250,378 | 2/1981 | Mutton | 250/221 |

*Primary Examiner*—David C. Nelms
*Assistant Examiner*—James G. Gatto
*Attorney, Agent, or Firm*—Thomas A. Briody; William J. Streeter; Marianne R. Rich

[57] ABSTRACT

A joystick controller for use with a home electronic video game produces electrical control signals in response to manipulation of a control stick. Within the controller housing a pair of light sources produce orthogonal light beams which are detected by respective light detectors to produce the control signals. A shutter, actuated by movement of the control stick, regulates the light falling onto the light detectors to produce control signals indicative of control stick positions.

1 Claim, 8 Drawing Figures

FIG. 1
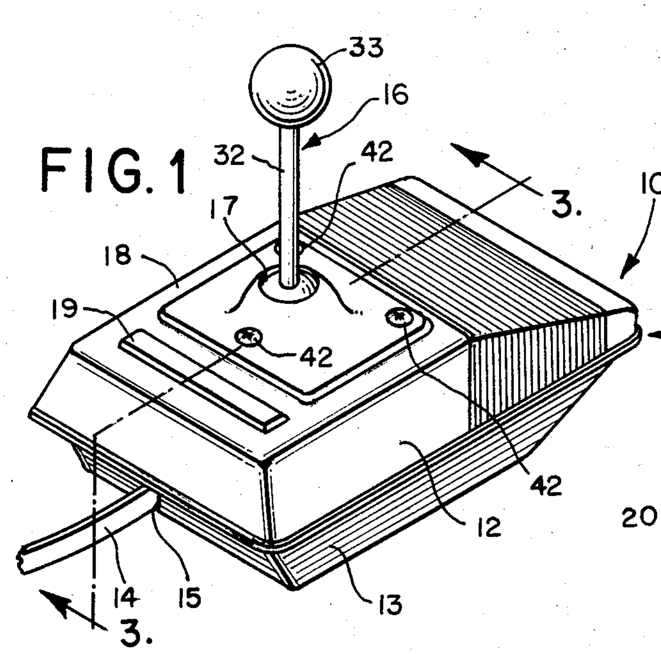
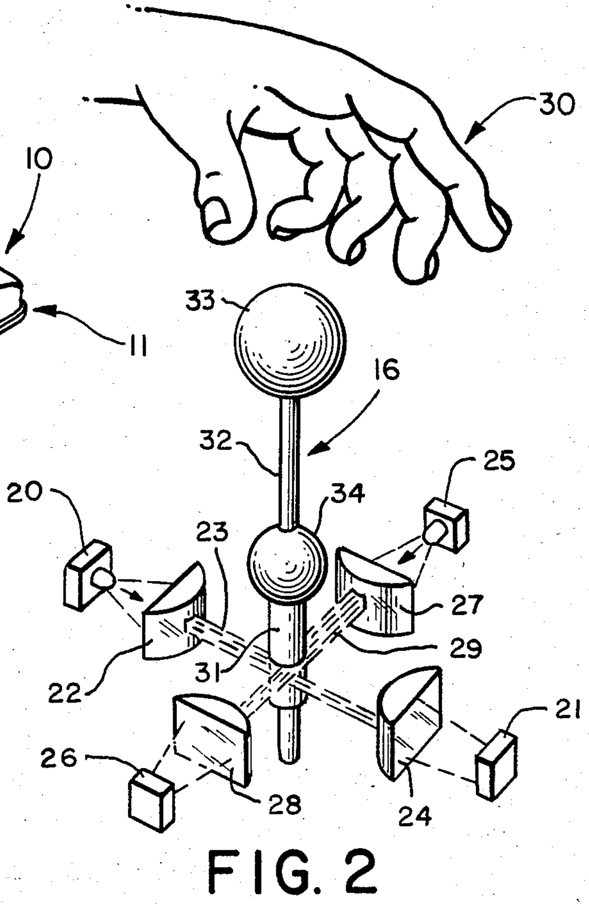
FIG. 2
FIG. 5
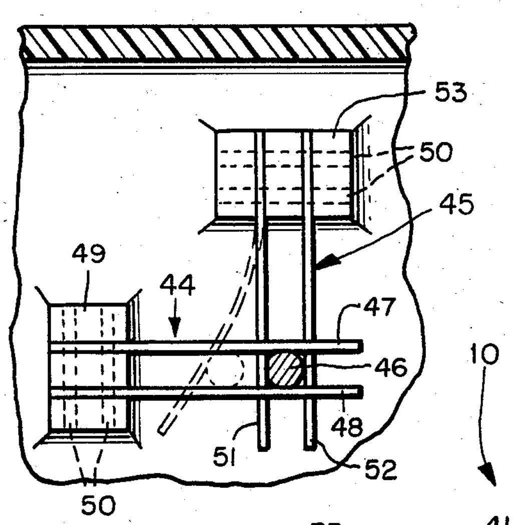
FIG. 3
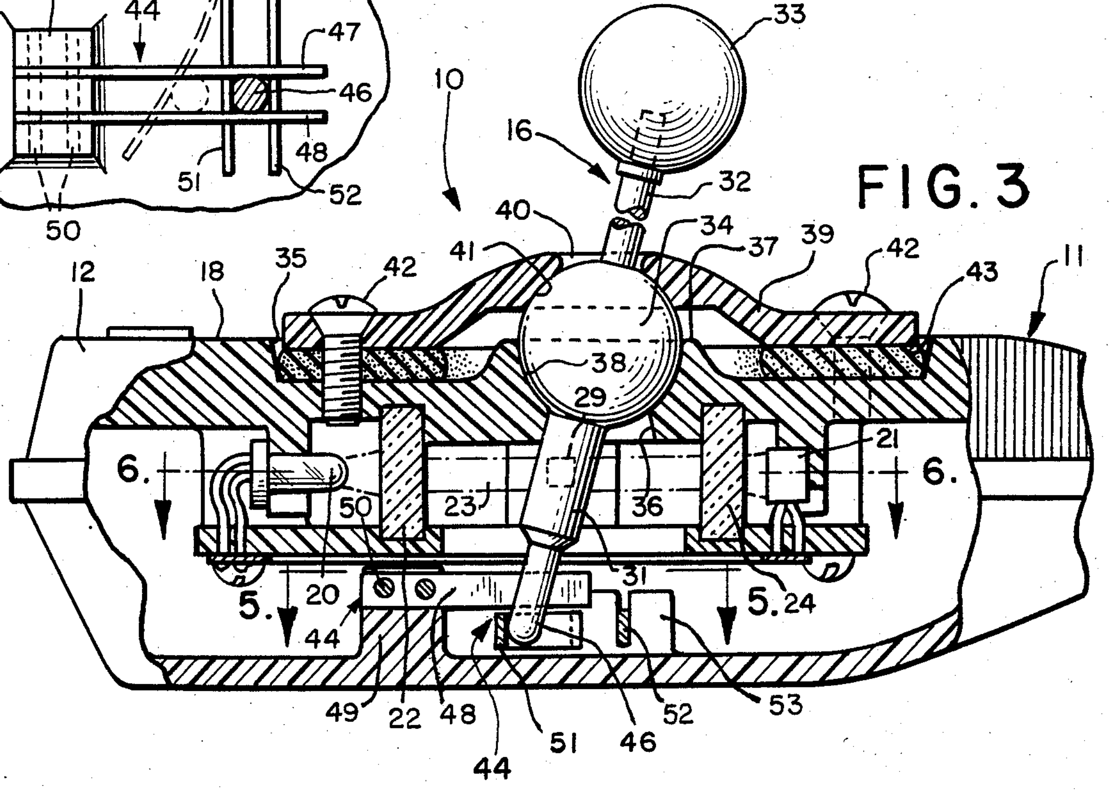

OPTICAL JOYSTICK CONTROLLER WITH INTERSECTING SPRING MEANS

BACKGROUND OF THE INVENTION

The present invention relates generally to electrical controls, and more particularly to hand-held joystick controllers for controlling the actions of game characters in electronic video games.

Electronic video game units intended for home use with standard television receivers typically are provided with one or more hand-held joystick controllers for controlling the actions and movements of game characters generated by the game unit and displayed on an associated video screen. Such controllers are connected to the game unit by means of a flexible electrical cable and are typically provided with a vertically extending joystick which the user displaces in the direction he wishes the game character to travel.

The design and construction of joystick controllers is of particular concern in that a well designed controller contributes enormously to user satisfaction with a particular game unit. Certain attributes, such as precision of control and carefully considered ergonomic requirements, are characteristic to well designed controllers. Such controllers are of a size and weight compatible with comfortable handheld use, and may be naturally and comfortably manipulated by the game player. They are also rugged in construction in order to provide reliable operation during prolonged periods of emotionally stimulating play. Furthermore, their construction must lend itself to economical manufacture using conventional manufacturing techniques without sacrificing quality and reliability. Finally, since joystick controllers frequently include the only parts of a video game system subject to substantial mechanical wear, efforts must be made to assure that their useful life is comparable to that of the remaining system components.

Previous joystick controllers relied on an arrangement of mechanical contacts or switch elements to provide electrical outputs in response to user manipulation of the control. When a controller utilizes simple electrical switch contacts, the output is necessarily digital in character and hence the possible degrees of freedom provided to video game characters by such a controller is limited by the number of switching elements it contains. In order to increase game character mobility, some controllers have been provided with one or more potentiometers, actuated by user manipulation of the control, which produce an analog rather than digital output response. Since they rely on mechanical switching components, previous controllers are susceptible to a variety of malfunctions, such as increased contact resistance or general mechanical failure, frequency encountered with any such mechanical switching devices.

In accordance with the present invention, a video game joystick controller having the above-noted desirable features is provided. Unlike joystick controllers heretofore known, the present controller relies on partial interruption of a collimated light beam to generate control signals in response to movement of the control stick. Mechanical switch contacts are entirely eliminated, thereby improving reliability, and moving parts are reduced to a minimum. A preferred analog output is provided by the controller, while the relatively few, and easily manufactured components, permit economical manufacture with a high degree of quality.

SUMMARY OF THE INVENTION

A joystick control produces an electrical control signal in response to user manipulation of the control, and includes a user-displaceable control stick. The control further includes a light source and a light detector in optical communication with the light source which produces an electrical signal in response from the light source falling onto the light detector. A shutter, which is coupled to and movable by the control stick is positioned between the light source and the light detector and regulates the passage of light from the light source onto the light detector. Movement of the control stick causes the shutter to vary the amount of light allowed to fall onto the light detector resulting in production of an electrical output signal indicative of the degree of control stick displacement.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a perspective view of an optical joystick control constructed in accordance with the present invention.

FIG. 2 is a perspective diagrammatic view useful in understanding the principle of operation of the control illustrated in FIG. 1.

FIG. 3 is a cross-sectional view of the control illustrated in FIG. 1 taken along line 3—3 thereof.

FIG. 5 is a cross-sectional view taken along line 5—5 of FIG. 3 illustrating the operation of the leaf springs in conjunction with the control stick.

DESCRIPTION OF THE PREFERRED EMBODIMENT

Figure 4:
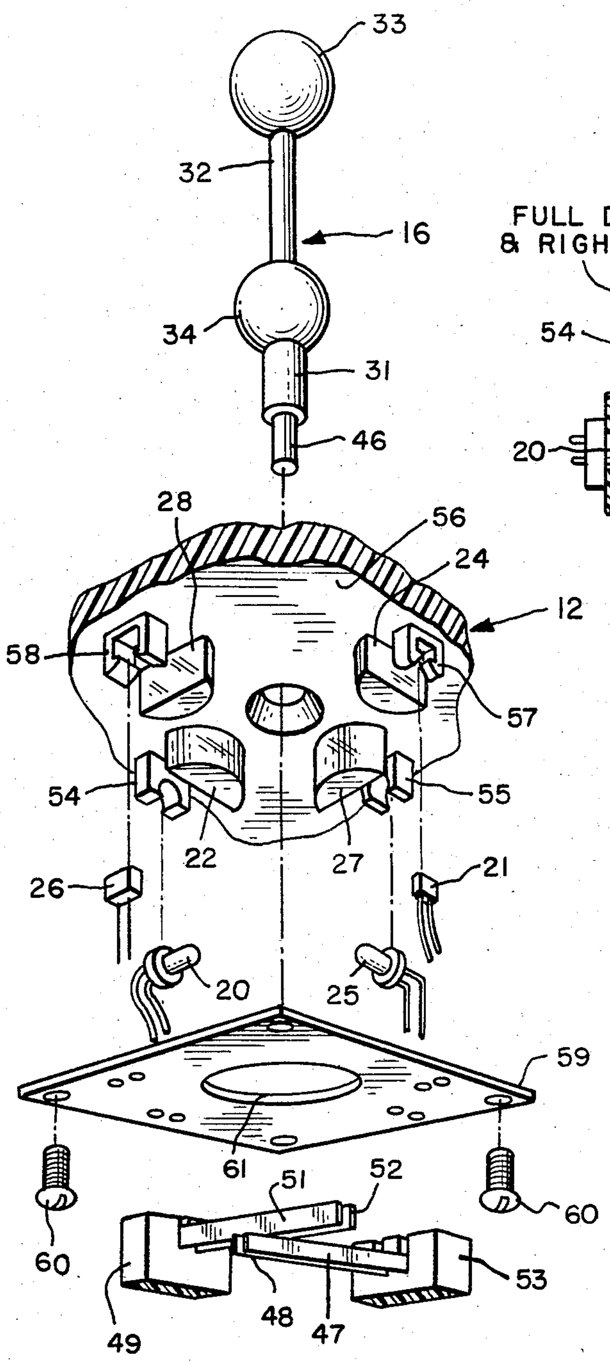
FIG. 4 is a fragmentary exploded perspective view of the control illustrated in FIG. 1 showing the principal elements thereof.

Referring to the figures and particularly to FIG. 1, an optical joystick controller constructed in accordance with the present invention is indicated generally by reference numeral 10. The controller includes an elongated generally rectangular housing 11 dimensioned to fit comfortably within the hand. As shown, the housing comprises upper and lower members 12 and 13, each of which may be fashioned from molded high-impact plastic or similar material.

The joystick controller 10 generates an electrical output in response to user manipulation of the control and accordingly, means for electrically interconnecting the controller with other electronic apparatus, such as a video game unit (not shown), are provided in the form of a multi-conductor cable 14. The cable extends through an aperture 15 provided in the lower housing member 13 and terminates in a connector (not shown)

which connects with a complementary connector (not shown) in the video game unit.

In order to control the actions of displayed video game characters, the joystick controller 10 includes two user-actuable controls; a direction switch in the form of an angularly-displaceable projecting stick-shaped control stick 16 extending through an aperture in the upper horizontal surface 18 of upper housing member 12, and a downwardly-displaceable event switch in the form of actuator bar 19 extending through an aperture transversely across the forward portion of the upper housing member, as illustrated.

In use, the control stick 16 may be angularly displaced with respect to the upper horizontal surface 18 of the housing 11 in any desired radial direction around its axis. Typically, such angular displacement will result in a corresponding change in the direction of motion of displayed video game characters. The actuator bar 19 is typically used to control such game character actions as the launching of projectiles at opposing game characters.

The principle of operation of the joystick control may best be understood by reference to FIG. 2. Basically, the controller serves to provide a pair of analog electrical outputs corresponding to the perpendicular components of control stick displacement. As shown, the control includes a light source 20 and a light detector 21 spaced apart therefrom. The light detector 21, in known manner, produces an analog electrical output signal in response to to the intensity of light which is allowed to fall upon it. A collimating lenses 22 concentrates the light produced by source 20 into a beam 23, while a focusing lens 24, positioned in the path of beam 23, focuses the beam onto the detector 21. A second light source 25 and detector 26, together with collimating and focusing lenses 27 and 28 are positioned to produce a second collimated light beam 29 along an axis perpendicular to the axis established by the first light source and detector.

In use, the control stick 16 is grasped with the hand 30 which then angularly displaces the control stick relative to the housing. To translate such angular displacement of the control stick 16 into a useful output signal, the joystick controller includes shutter means 31 responsive to such angular displacement for regulating the light falling on detectors 21 and 26. As shown in FIG. 2, the shutter means may take the form of a cylindrical extension of the control stick 16 which projects partially into each of beams 23 and 29 when the stick is in its normal operating position. When thus positioned, the shutter 31 increasingly or decreasingly blocks the light beams in response to angular displacement of control stick 16, thereby varying the intensity of light falling on each of the detectors 21 and 26 with the effect that the output signals they produce vary. Since any such displacement may be resolved into a pair of orthogonal components, the use of two independent light sources and detectors results in the production of a unique output in response to each unique position of the control stick.

FIGS. 3, 4 and 5 illustrate in greater detail the internal configuration and operation of a joystick controller, the operation of which is based on the principle thus described.

Referring to FIG. 3, the control stick 16 is seen to comprise a central cylindrical shaft 32 having a generally spherical knob 33 at one end which facilitates convenient manipulation of the controller. In order to pivotally mount the control stick 16 to the housing 11, shaft 32 is provided with a generally spherical pivot ball 34 the center of which lies on the longitudinal axis of the shaft. The upper surface 18 of the upper housing member 12 is provided with a generally rectangular recess 35 having an aperture 36 through its center thereby allowing access to the interior region of the housing 11. The area around aperture 36 is raised to form a pillar 37 the upper surface of which is shaped to conform to the shape of the pivot ball thereby forming a socket 38 for receiving the pivot ball 34. A generally rectangular cover 39 having an aperture 40 therethrough includes an similar socket 41 on its interior surface adjacent aperture 40 which cooperates with socket 38 to pivotally contain the ball 34 therebetween. The cover 39 is maintained in position over recess 35 by means of three screws 42 while a rectangular rubber gasket 43 between the cover and the recess permits friction between the ball and sockets to be adjusted by means of adjusting screw tension to suit the tastes of individual users.

As further illustrated in FIG. 3, one end of the shaft 32 passes completely through the pivot ball 34 and accordingly extends into the interior region of the housing when the control stick is installed. Angular displacement of the control stick by a user results in complementary angular displacement of this end within the housing.

To restore the control stick 16 to a vertical position following angular displacement with respect to the 11 housing, the controller is provided with a pair of perpendicularly oriented leaf springs 44 amd 45. best seen in FIGS. 3 and 5, which engage the lowermost end 46 of the control stick. Leaf spring 44 is seen to comprise a pair of parallel spaced-apart horizontally disposed spring fingers 47 and 48 fashioned from spring steel or similar material, and fastened to a suitably located pillar 49 by means of a pair of rivets 50. Spring 45, comprising spring fingers 51 and 52 similarly fastened to another pillar 53 at a vertical height somewhat above that of spring 44 thereby providing clearance for that spring. Angular displacement of the control stick results in deflection of at least one of the spring fingers with the result that an appropriate restoring force is applied to the lower end 46 of the control stick. Accordingly, springs 44 and 45 serve to return the control stick to a substantially vertical position relative to the housing when the control stick is released.

In the example illustrated, the light sources 20 and 25 for providing the perpendicular beams of light take the form of a pair of light emitting diodes (LED) which in known manner produce light in response to the flow of current therethrough. Preferably, LED's having a narrow beam divergence angle are provided. Examples of suitable devices include the EL-1L1 infrared LED manufactured by Centronic, Inc. and the SE304 manufactured by NEC, Inc. As best seen in FIG. 4, the LED's are maintained in perpendicular orientation relative to one another by means of a pair of depending pillars 54 and 55 integrally formed along the upper interior surface 56 of upper housing member 12. Each of these pillars is provided with a generally circular cutout along its lowermost edge which is dimensioned to receive one of the LED's. Accordingly, each of the LED's may be pressed into its respective pillar thereby precluding misalignment of the diodes.

As further shown in FIG. 4, the light detecting means 21 and 26 take the form of a pair of phototransistors which exhibit a variable resistance in response to the intensity of light allowed to fall thereon. Examples of such phototransistors are those manufactured by NEC, Inc. and designated No. PH104. Depending pillars 57 and 58, also integrally formed in the upper interior surface, receive the phototransistors thereby maintaining the desired orientation of the phototransistors to the LED's. As shown, pillars 57 and 58, lie along perpendicular axes.

In order to concentrate the light produced by LED's into distinct beams, first and second collimating lenses 22 and 27 are positioned in front of LED's 20 and 25 respectively. These lenses in known manner serve to collimate the light produced by each of the LED's. The first and second focusing lenses 24 and 28, which may be identical with the collimating lenses 22 and 27, are positioned in front of phototransistors 21 and 26 respectively and focus the columnated light beams onto the respective phototransistors. When semi-cylindrical lenses such as those illustrated are utilized, a light beam having a definite width is thereby produced. Such lenses may be advantageously fashioned from injection molded plastic to avoid increasing manufacturing costs. Suitable locating tabs or recesses may be provided in the upper interior surface 56 of the upper housing member in order to accurately fix the location of each lens relative to the light sources and detectors.

Electrical interconnections between the LED's and phototransistors are provided by means of a circuit board 59 of conventional manufacture positioned within the housing immediately beneath the LEDs and phototransistors therein and is affixed to the housing by means of screws 60. Circuit board 59 is provided with a central aperture 61 through which the control stick 16 passes when it is mounted to the control housing.

To regulate the light falling onto phototransistors 21 and 26, the shutter 31 is positioned between each LED and its associated phototransistor. In the embodiment shown, the shutter, comprising a generally cylindrical enlarged region of the control stick in the area immediately beneath the pivot ball, is dimensioned somewhat larger than the width of each collimated light beam 23 and 29 (FIG. 2) in order to fully eclipse each light source when the shutter is moved fully into the beam path. In practice, the entire control stick 16 including knob 33, shaft 32, pivot ball 34, shutter 31 and lowermost end 46 may be fashioned in one piece from injection molded plastic or similar durable material. It will be apparent by reference to the Figures that angular displacement of the control stick will result in corresponding angular displacement of the shutter between the LED's and phototransistors.

Figure 6A:
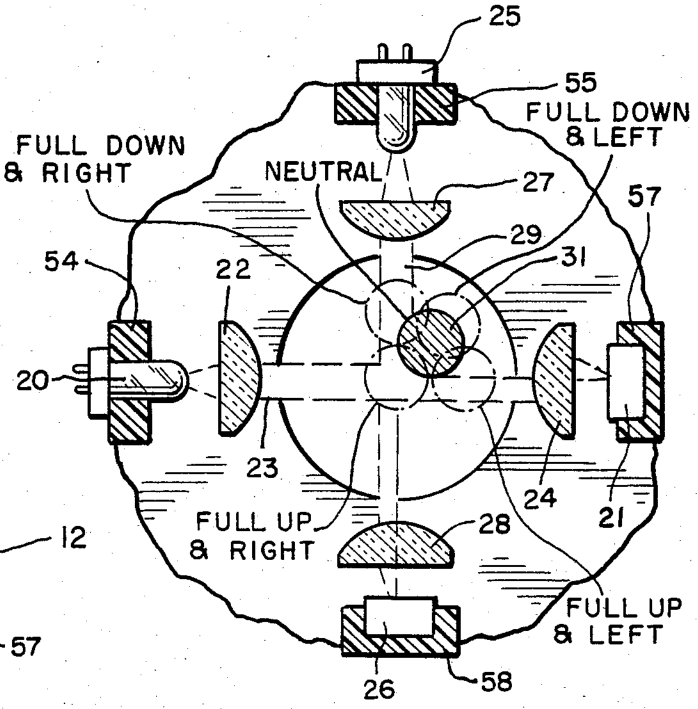
FIGS. 6 and 6*a* are cross-sectional views taken along line 6—6 showing the relationship of the light shutter to the light beams for various control stick deflections.
Figure 6:
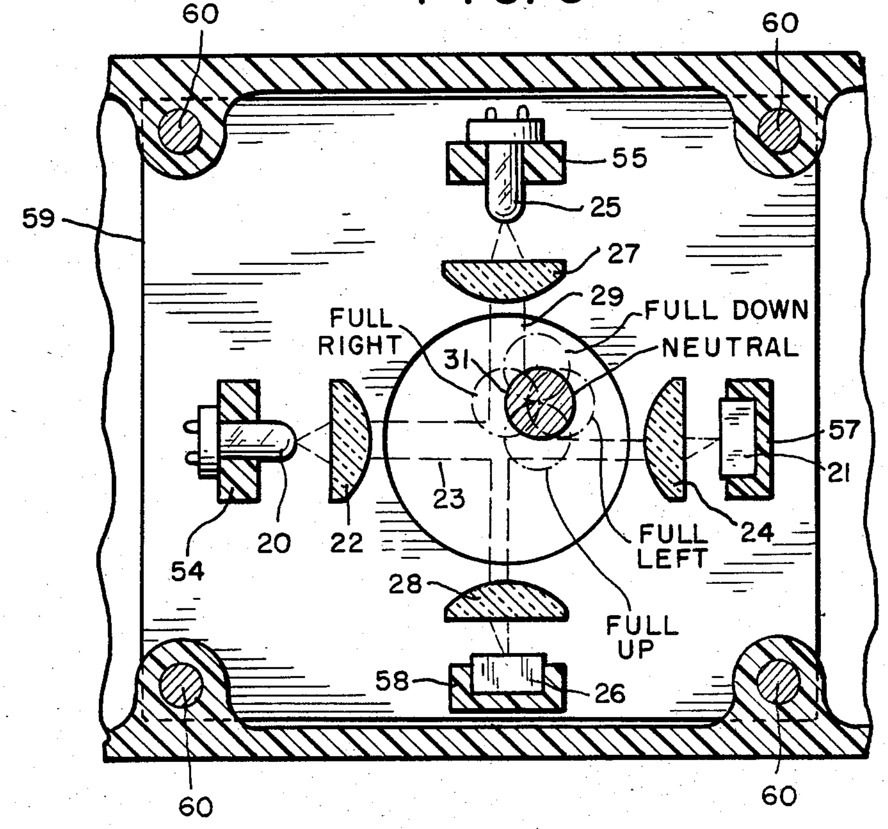

FIGS. 6 and 6*a* illustrate in greater detail the orientation of the shutter 31 with respect to each of the light beams 23 and 29 resulting from various positions of the control stick. Referring to FIG. 6, when the control stick is in its normal vertical undeflected position, the shutter 31 partially intersects each of the columnated light beams 23 and 29 effectively eclipsing each beam by approximately 50%. To achieve this orientation, each of the pillars is offset somewhat from the shutter as illustrated in the Figure. As a result of this offset, angular displacement of the control stick allows the shutter to swing from a first position where it effectively totally eclipses the light source to a second position in which the light source is totally exposed. Accordingly, the output of each phototransistor varies from minimum to maximum as a result of such displacement.

The various orientations of the shutter relative to the light beams resulting from reflection of the control stick in the directions indicated is shown by the phantom clines of FIGS. 6 and 6*a*. FIG. 6 shows the orientations of the shutter resulting from deflection of the control stick in a cardinal direction. When deflected in such a direction, movement of the shutter is parallel with one or the other of the beams, resulting in no change in the intensity of the parallel beam. The perpendicular beam however may be totally blocked or totally unaffected depending on the direction of deflection of the shutter.

FIG. 6*a* shows the shutter when deflected in a noncardinal direction. Here it will be observed, that each of the beams is affected by such displacement. Accordingly, the signals produced by phototransistors 21 and 26 will change in accordance with such deflection.

Figure 7:
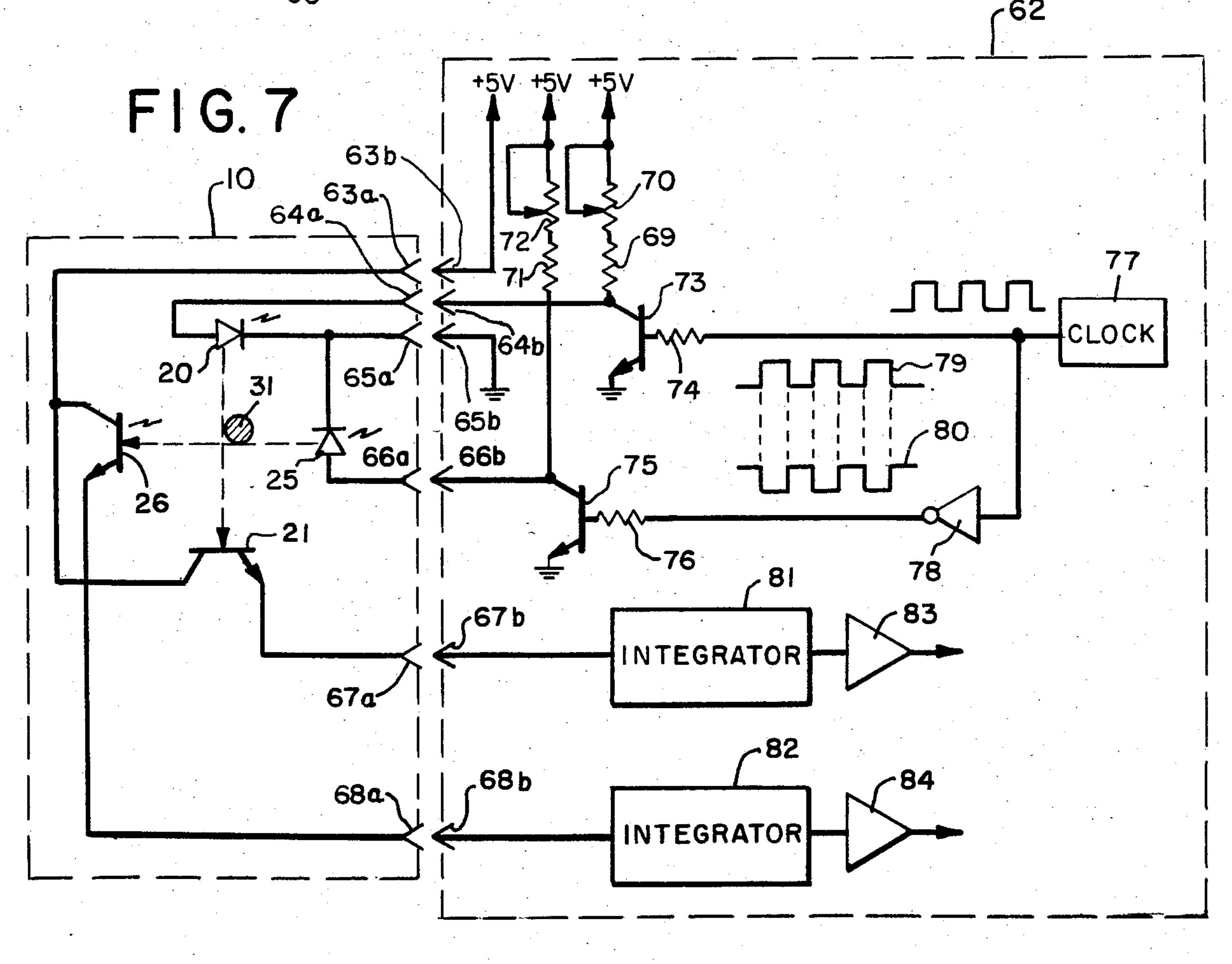
FIG. 7 is a simplified electrical schematic diagram of the control illustrated in FIG. 1, in conjunction with suitable interface circuitry for actuating the control.

The electrical operation of the joystick control may best be understood by reference to the simplified schematic diagram of FIG. 7. As illustrated, the joystick controller 10 is electrically interconnected with a video game unit 62 by means of connector contacts 63*a* and 63*b*, 64*a* and 64*b*, . . . 68*a* and 68*b*. Within the controller the LED's 20 and 25, produce perpendicular beams of infrared or visible light when suitably energized. The cathodes of these diodes are each connected to ground through contact 65*a*, 65*b* while the anodes of each are individually connected to separate contacts 64*a* and 66*a*. The light beams thus produced are detected by means of phototransistors 21 and 26 the collectors of which are connected to a +5 Vdc supply through contacts 63*a* and 63*b* and the emitters of which are individually connected to contacts 67*a* and 68*a*. When thus connected, voltage applied to either contact 64*a* or 66*a* results in the production of light by LEDs 20 and 25 respectively, while phototransistors 21 and 26 respectively produce analog outputs at contacts 67*a* and 68*a* in response to the intensity of the light which falls on each.

Referring now to the circuitry within the video game unit 62, the anode of LED 20 is connected to +5 Vdc through the series combination of resistor 69 and potentiometer 70 which determine the forward bias current through the LED. Similarly, the serial combination of resistor 71 and potentiometer 72 regulates current through LED 25.

To permit independent energization of LED 20, the circuit includes an NPN transistor 73 the collector of which is connected through contacts 64*a* and 64*b* to the anode of LED 20, and the emitter of which is connected to ground. A positive voltage applied to the base of this transistor through a resistor biases the transistor on, thereby preventing actuation of LED 20. A low voltage applied to the base of transistor 73 through resistor 74 biases the transistor off, thereby actuating the LED. Similarly, NPN transistor 75 having its collector connected to the anode of LED 25 through contacts 66*a* and 66*b* and having its emitter connected to ground, controls actuation of LED 25 in response to positive polarity voltage applied to its base through resistor 76.

To alternately energize LED's the video game unit includes a clock circuit 77 of known construction, which produces a continuous series of square wave pulses for application to transistors 73 and 76 for alternately actuating LED's 20 and 25. The clock output is connected directly to resistor 74 while the clock signal applied to resistor 76 is first inverted by means of passing the clock signal through an inverter 78. Accordingly, the signals applied as to the transistors are as shown by the waveforms 79 and 80 and hence each LED is repetitively actuated and disabled so that only one is actuated at any given time.

In order to convert the analog output signals provided by phototransistors 21 and 26 to a form useful for controlling game characters, the video game unit includes a pair of integrating circuits 81 and 82 of known construction which individually integrate the output pulses provided by the phototransistors. Once integrated, additional circuits 83 and 84 circuitry condition the signal as appropriate for further use by the video game unit.

In the circuit shown, it will be apparent that each light pulse generated by LED 20 or LED 25 results in the production of a corresponding output pulse by either phototransistor 21 or phototransistor 26. Furthermore, the magnitude of the output pulse so provided varies according to the intensity of light allowed to fall on the phototransistors. Accordingly, the signal appearing at the output of each integrator circuit will vary according to the intensity of light striking each phototransistor which in turn is a function of the shutter position. When the shutter is positioned as to totally obscure LED 20 thereby preventing any light from striking phototransistor 21, no current flows through the phototransistor with the result that integrater circuit 81 provides a zero output. Similarly, when the shutter 31 is displaced entirely from the light path, maximum current passes through phototransistor 21 with the result that a maximum signal appears at the output of integrater circuit 81.

In selecting suitable component values, it is desirable that the values selected result in a smooth transition from minimum to maximum output signal in response to steadily increasing deflection of the control stick from one extreme to the other. This depends in part upon the forward bias LED current selected and on the clock frequency. Typically, potentiometers 70 and 72 should be adjusted to allow a forward bias LED current of approximately 8 to 20Ma. when the previously mentioned LED's are selected. In selecting clock frequency, it is important to consider rise time of the LED outputs and accordingly a clock frequency substantially greater than the rise time should be selected. By way of example, a clock frequency of 500 Hz has been found to be satisfactory.

It will be appreciated that while the joystick control allows the production of analog signals in response to angular displacement of the control stick, the outputs so produced may nevertheless be processed by conventional means to produce signals compatible with the use of digital circuitry. Thus, a high degree of flexibility is provided by the joystick control since analog or digital outputs may be produced as required by any specific application. It will also be apparent that while specific component part numbers have been mentioned, a variety of such components may equally well be adapted to use with the joystick control. Furthermore, lenses other than the cylindrical lenses mentioned may be utilized without departing from the scope of the invention. For example, spherical lenses may easily be substituted without significantly altering operation of the joystick control.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A joystick controlled apparatus for producing an electrical control signal in response to user activation of said joystick, said apparatus having light emitting means emitting light along a predetermined path and light detecting means positioned along said predetermined path for furnishing said electrical control signal varying in accordance with light falling thereon, the improvement comprising:

a housing;

mounting means in said housing for pivotably mounting a cooperating member received therein;

retaining means permitting simultaneous motion in a first and second mutually perpendicular direction of a member inserted therein; and a joystick having a first end adapted for user activation, a pivoting member connected to said first end for cooperating with said mounting means under control of said user activation, an elongated member connected to said pivoting member and extending therefrom into said path of said light for blocking light from said light detecting means in correspondence to said user activation, said second elongated member further having a retained end portion extending into said retaining means; and wherein said retaining means comprises a first and second pair of intersecting springs arranged at right angles to one another thereby forming an intersection for receiving said retained end of said second elongated member and returning said retained end and therefore said joystick to a predetermined starting position in the absence of said user activation.

* * * * *